(12) United States Patent
Fraley et al.

(10) Patent No.: US 6,811,186 B1
(45) Date of Patent: Nov. 2, 2004

(54) SEAT BELT ADJUSTMENT MECHANISM

(75) Inventors: Gregory S. Fraley, Farmington Hills, MI (US); Xiaoqin Xie, West Bloomfield, MI (US)

(73) Assignee: Lear Corporation, Southfield, MI (US)

(*) Notice: Subject to any disclaimer, the term of this patent is extended or adjusted under 35 U.S.C. 154(b) by 84 days.

(21) Appl. No.: 10/113,894

(22) Filed: Mar. 29, 2002

(51) Int. Cl.[7] .............................................. B60R 22/20
(52) U.S. Cl. ................... 280/801.2; 280/808; 297/473; 297/483; 297/484
(58) Field of Search ........................... 280/801.2, 801.1, 280/808; 297/483, 473, 464, 484, 468

(56) References Cited

U.S. PATENT DOCUMENTS

| | | |
|---|---|---|
| 3,471,197 A | 10/1969 | Ely |
| 4,652,053 A | 3/1987 | Mikami |
| 4,919,488 A | 4/1990 | Deegener et al. |
| 5,088,794 A | 2/1992 | Iwami et al. |
| 5,123,673 A | 6/1992 | Tame |
| 5,358,310 A | 10/1994 | Nemoto |
| 5,390,982 A | 2/1995 | Johnson et al. |
| 5,441,332 A | 8/1995 | Verellen |
| 5,449,223 A * | 9/1995 | Miculici et al. ............. 280/808 |
| 5,599,070 A | 2/1997 | Pham et al. |
| 5,671,976 A | 9/1997 | Fredrick |
| 5,722,731 A | 3/1998 | Chang |
| 5,743,597 A | 4/1998 | Jessup et al. |
| 6,003,899 A | 12/1999 | Chaney |
| 6,065,810 A | 5/2000 | Koenig et al. |
| 6,139,111 A | 10/2000 | Pywell et al. |
| 6,145,881 A | 11/2000 | Miller, III et al. |
| 6,155,601 A | 12/2000 | Cantor et al. |
| 6,179,329 B1 | 1/2001 | Bradley |
| 6,203,110 B1 | 3/2001 | Proteau et al. |
| 6,250,680 B1 | 6/2001 | Möker |
| 6,264,280 B1 | 7/2001 | Öhlund |
| 6,267,409 B1 | 7/2001 | Townsend et al. |
| 6,293,588 B1 | 9/2001 | Clune |
| 6,305,713 B1 | 10/2001 | Pywell et al. |
| 6,446,910 B1 * | 9/2002 | Knoll et al. ............. 280/801.1 |

FOREIGN PATENT DOCUMENTS

| | | | |
|---|---|---|---|
| EP | 0 251 242 | 1/1988 | |
| EP | 0 374 893 | 6/1990 | |
| JP | 5-301560 | * 11/1993 | ................. 280/808 |
| JP | 2002-240682 | 8/2002 | |
| JP | 2002-274322 | 9/2002 | |

* cited by examiner

Primary Examiner—Eric Culbreth
(74) Attorney, Agent, or Firm—Bill C. Panagos

(57) ABSTRACT

A restraint apparatus for a vehicle seat includes a seat back for supporting an occupant. The seat back defines a generally vertical axis and a generally horizontal axis. The apparatus further includes a guide for directing a restraint which is adapted to pass over a shoulder of an occupant of the seat. The guide is movably mounted relative to the seat back such that the guide is movable to alter the distance from the shoulder of the occupant relative to both of the vertical and horizontal axes, thereby adjusting the position of the restraint relative to the shoulder of a seat occupant.

17 Claims, 5 Drawing Sheets

SEAT BELT ADJUSTMENT MECHANISM

FIELD OF THE INVENTION

This invention relates in general to vehicle seat occupant restraints, and more particularly to restraints that are adjustable relative to the seat for the maximum comfort of seat occupants of different sizes.

BACKGROUND OF INVENTION

Most passenger vehicles include seat belts or flexible safety restraints for restricting the movement of a seat occupant, especially during high deceleration events. Commonly, passenger vehicles include a single flexible restraint which is configured in a three point restraint system, wherein the restraint is generally fixed about a first point located adjacent the leaf hip of the occupant, a second point located adjacent the right hip of the occupant, and a third point located above and behind one of the shoulders of the occupant. Although it is known to adjust the vertical height position of the third point for comfort and safety of the occupant, known systems do not offer the flexibility of maneuvering the third point to any desired position.

Some restraint systems are configured in a four point restraint system, wherein two or more flexible restraints are generally fixed about first and second points located on either side of the hip of the occupant, and third and fourth points located above and behind the left and right shoulder occupant, with the straps having portions extending in front of the occupant. Although these restraint systems function relatively well, it would be useful to adjust the position of the generally fixed points for both comfort and safety of the occupant.

BRIEF SUMMARY OF THE INVENTION

A restraint apparatus for a vehicle seat includes a seat back for supporting an occupant. The seat back defines a generally vertical axis and a generally horizontal axis. The apparatus further includes a guide for directing a restraint which is adapted to pass over a shoulder of an occupant of the seat. The guide is movably mounted relative to the seat back such that the guide is movable to alter the distance from the shoulder of the occupant relative to both of the vertical and horizontal axes, thereby adjusting the position of the restraint relative to the shoulder of a seat occupant.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
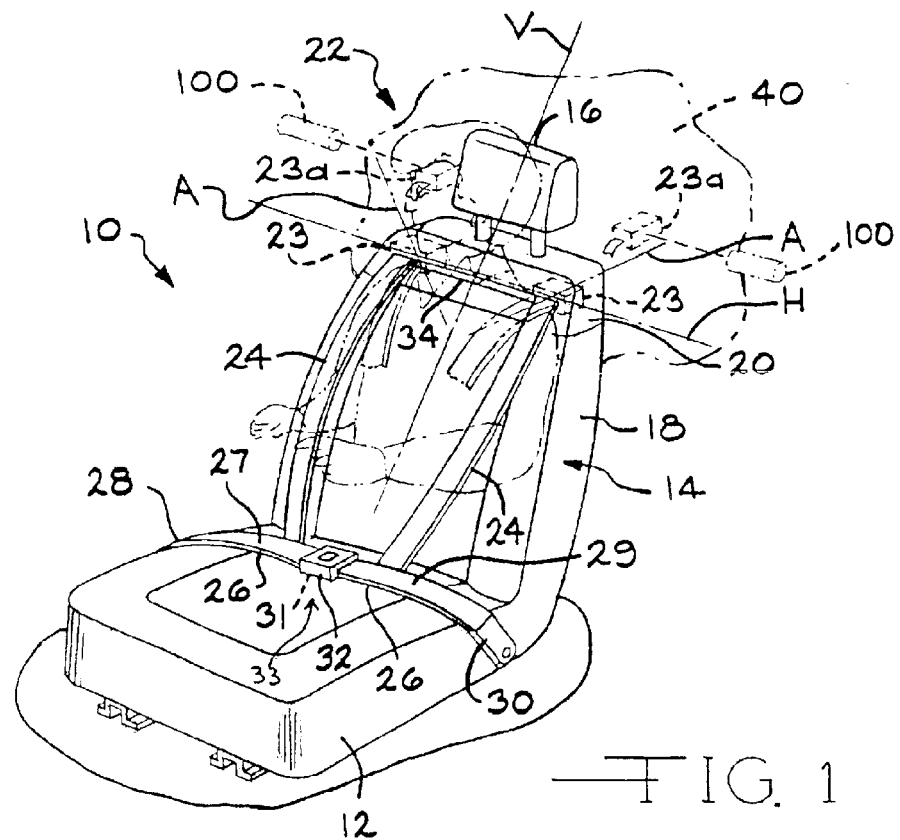
FIG. 1 is a perspective view of a vehicle seat depicting a seat belt adjustment mechanism, in accordance with this invention.

Referring now to the drawings, there is illustrated in FIG. 1 a portion of a vehicle seat, indicated generally at 10, generally having a seat bottom 12, a seat back 14 and a headrest 16. The seat bottom 12 is conventionally mounted, preferably on seat adjusters (not shown) to the vehicle frame (not shown) for fore and aft movement and/or vertical movement. The seat back 14 comprises a lower portion 18 and an upper portion 20. The seat back 14 is further adapted to be pivotally mounted relative to the seat bottom and can be pivoted in either forward or rearward rotational direction for the comfort and use of the occupant. The headrest 16 is positioned atop the seat back 14 and preferably above the upper portion 20.

A restraint apparatus or seat belt adjustment mechanism 22, in accordance with the present invention, is contained within the upper portion 20 of the seat back 14. It is understood that the mechanism 22 can also be uncovered or partially covered and still perform as described below. The adjustment mechanism 22 includes at least one seat belt guide 23. For a single seat belt guide 23 and for a vehicle seat 10 on a left side of a vehicle, such as a driver's seat in an automobile, the seat belt guide 23 is preferably on the left side of the headrest 16. For a seat 10 on the right side of the vehicle, such as a passenger seat, the seat belt guide 23 is preferably on the right side of the headrest 16. In a preferred embodiment, the seat belt adjustment mechanism 22 has a pair of seat belt guides 23 with one positioned on either side of the headrest 16. The seat belt adjustment mechanism 22 will be described in greater detail below.

Figure 2:
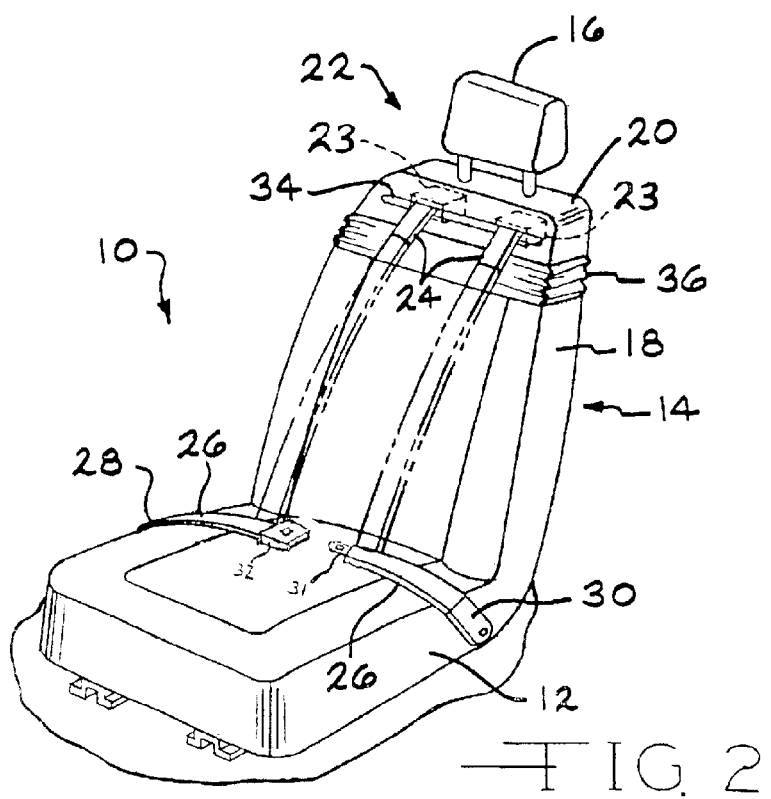
FIG. 2 is the seat of FIG. 1 showing the seat belt adjustment mechanism in an adjusted position relative to the seat.

Extending from each seat belt guide 23 is a flexible belt or restraint 24 that is conventional in the art, and is commonly known as a shoulder belt. The shoulder belt 24 is typically adapted to pass over a shoulder of a seat occupant, as shown in phantom lines in FIG. 1, so as to restrain the occupant during a sudden deceleration or acceleration event. It should be understood that any suitable restraint arrangement, such as number of straps and strap orientation, can be used with the adjustment mechanism 22 of the present invention. In a "four-point" seat belt system, a pair of shoulder belts 24 extend from the upper portion 20 of the seat back 14 and operatively connect to a pair of lap belts 26. The shoulder belts 24 can be connected to the lap belts by any suitable manner. The embodiment illustrated in FIGS. 1 and 2 is known as a "suspender" four point type restraint system, wherein the shoulder belts 24 are generally positioned on the torso of the occupant in a manner similar to clothing suspenders, such that the pair of shoulder belts 24 do not cross each other and have a generally vertical orientation, as shown. The shoulder belts 24 are fixedly connected to the lap belts 26 near the inner ends 27, 29 of the pair of opposed lap belts 26. The inner ends 27, 29 of each belt 26 are adapted to connect together, for example, by having one or more buckles 33. The belt buckle 33 is generally conventional in the art typically having a female clasp portion 32 (more clearly shown in FIG. 2) and a male tongue portion 31 that can be received within the clasp portion 32 to make a fixed but releasable connection. It is understood that any means for releasably connecting the belts will be suitable for the purpose of this invention. The shoulder belts 24 and the respective lap belts 26 could be the same length of restraint, wherein a central portion thereof is connected to one of the buckles 33. The outer ends 28, 30 of the lap belts 26 are fixedly connected at laterally opposite ends to the seat bottom, the seat bottom frame or the vehicle frame by any conventional means. The seat belt adjustment mechanism could also be incorporated into a "criss-cross" four point style restraint system, wherein the shoulder belts 24 cross each other to form a generally "X" shape across the torso of the occupant. Thus, the upper portion of a shoulder belt 24 adjacent the occupant's right shoulder extends downward adjacent the left hip point of the occupant, and vice versa for the other shoulder belt 24.

The seat belt adjustment mechanism 22 could also be incorporated into a three-point seat belt system (not shown), wherein a single shoulder belt is connected to a single lap belt. The belts are preferably fixedly connected to each other and releasably connected to the vehicle by a buckle system, preferably with the male portion attached to the end of the belt and the female portion connected to the seat or vehicle. In either a three-point or four-point seat belt system, it is preferred that the lap belts 26 extend transversely across the pelvic regions of the occupant to further restrain the occupant during a deceleration event in conjunction with the shoulder belt 24 or belts.

The adjustment mechanism 22 is shown within the upper portion 20 of the seat back 14 and extends along the width of the seat back body 18. However, it is understood that the adjustment mechanism 22 can have a shorter or longer relative length or any desired shape or size and perform the function of the invention. The adjustment mechanism 22 is also shown positioned below the headrest 16 but can have any other position that is suitable for use with the invention. For example, in an alternate embodiment the mechanism 22 can be positioned on either side of the headrest 16 (see FIG. 6). With the four-point shoulder belt system shown, the seat belt adjustment mechanism 22 has a pair of shoulder belts 24 extending from horizontally spaced guides 23 positioned on either side of the headrest 16 toward the seat bottom 12 as described above. A generally horizontal slot 34 is formed in the seat back upper portion 20 to accommodate generally horizontal movement, described below, of the shoulder belts 24 within the upper portion 20. The seat belt adjustment mechanism 22 is shown in a lowered position, with the shoulder belts 22 having the furthest horizontal separation. As will be described in detail below, the guides 23 or 23a are movably mounted relative to the seat back such that the guide is movable to change or alter the distance of the respective restraint 24 from the shoulder of the occupant relative to a vertical axis V and a horizontal axis H, thereby adjusting the position of the restraint 24 relative to the shoulder of the seat occupant. It should be understood that when referring to the orientation, movement or position of the guides 23 and 23a as used herein, the terms "horizontal" and "vertical" are general terms used to approximate their orientation relative to the horizon or floor of the vehicle. More particularly, the term "vertical" is used to approximate an axis defined by the seating surface of the seat back and may be angled or offset compared to an exact vertical axis due to the inclined position of the seat back for support and comfort of the seat occupant.

Also shown in FIG. 1, in phantom lines, is the seat belt adjustment mechanism 22, in accordance with the invention, wherein a pair of guides 23a are connected to a portion of the vehicle, such as a bulkhead 40. This, for example, could be the attachment location in a two-seat vehicle. Alternatively, this could be the attachment location of the shoulder belts if the shoulder belts 24 are connected directly to the vehicle, such as by a D-clip, and the shoulder belts are not connected directly to the seat. In such a case, where the adjustment mechanism 22 is connected to a bulkhead 40, similar horizontal and vertical adjustment of the mechanism 22 is possible as will be described below.

Figure 3:
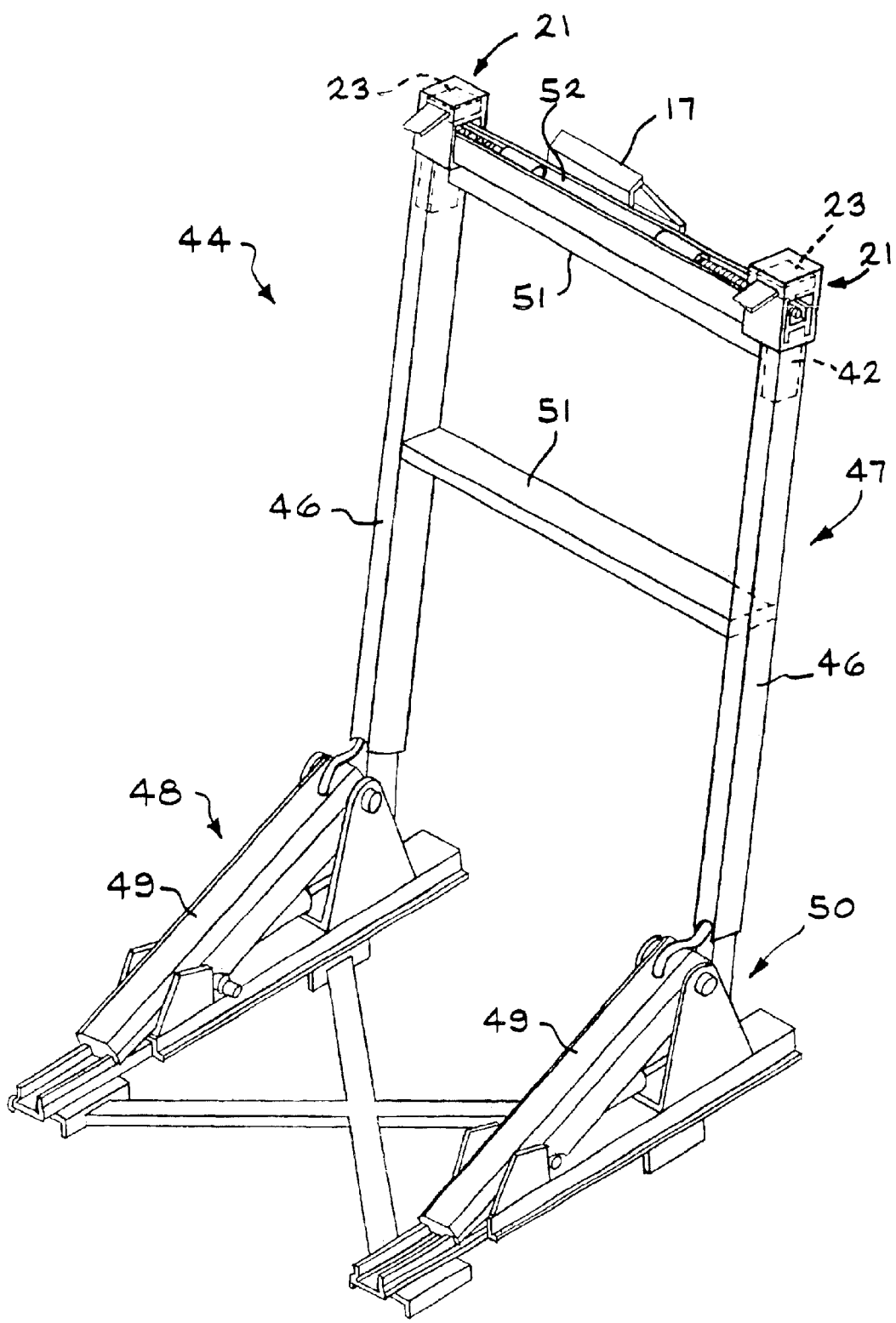
FIG. 3 is a perspective view of a vehicle seat frame showing the seat belt adjustment mechanism in accordance with this invention.
Figure 4:
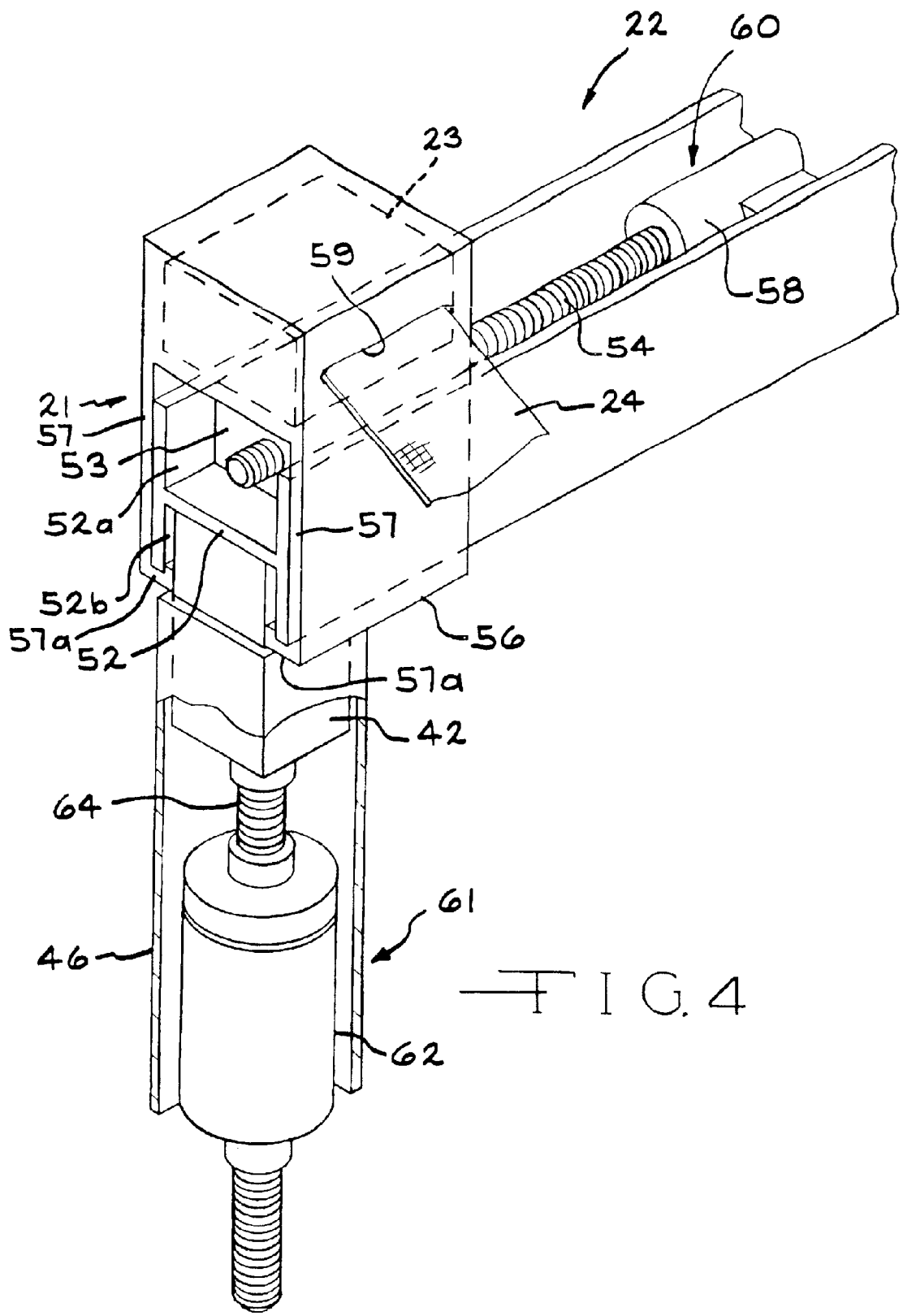
FIG. 4 is an enlarged perspective view of one seat belt adjustment guides in an initial position.
Figure 5:
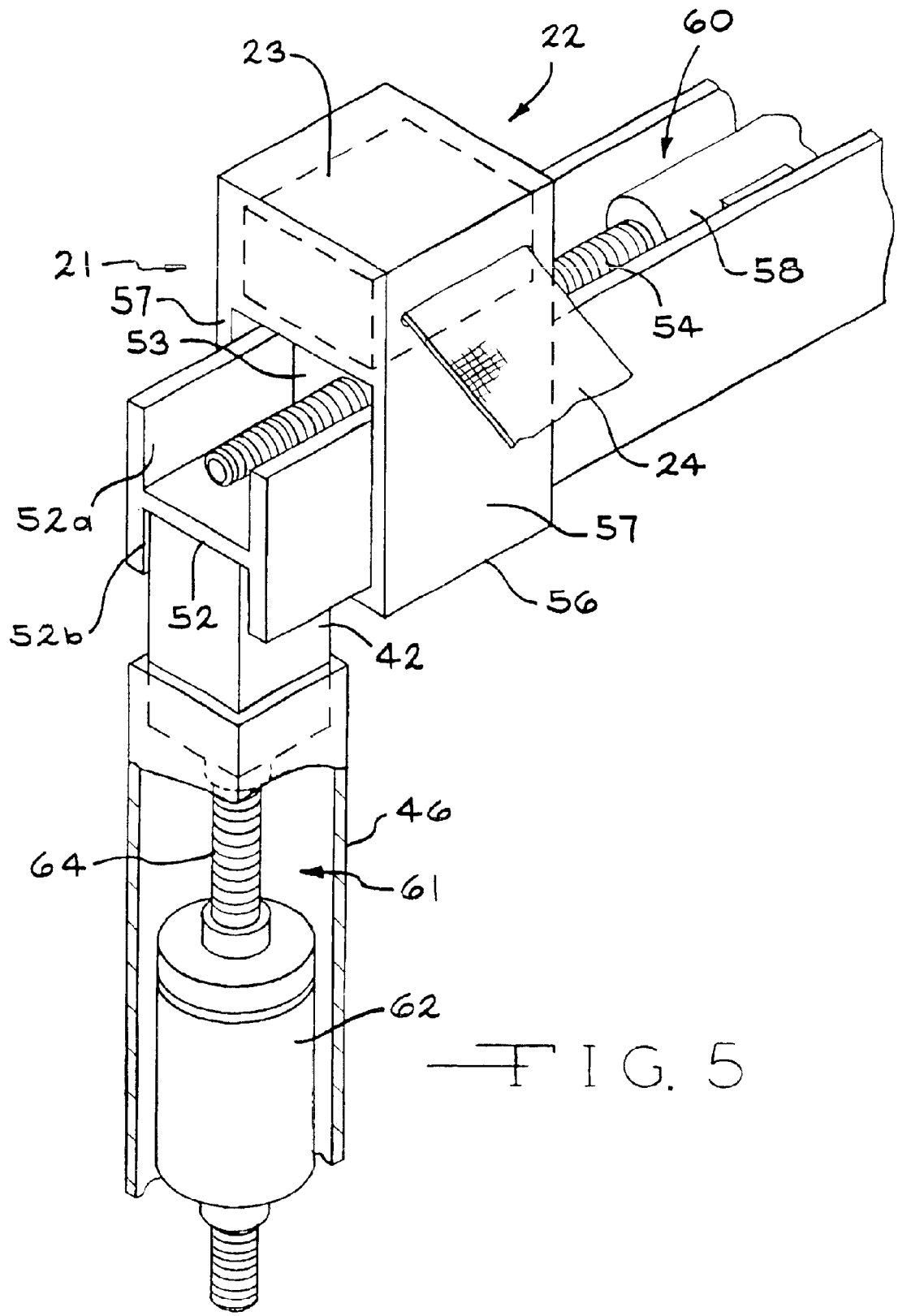
FIG. 5 is the adjustment mechanism shown in FIG. 4 after being horizontally and vertically adjusted.

As shown in FIG. 1, there is schematically illustrated a drive mechanism 100 which can be used for adjustment of the position of the guides 23a. It should be understood that any suitable drive mechanism can be used to move the guides 23 and 23a. As shown in FIGS. 3 through 5, and described in detail below, motorized drive screw mechanisms are used to move the guides 23. The drive mechanisms can be manually operated, such that a handle is used by the occupant to mechanically move the guides, or electrically operated, such that electric controls are operated by the occupant to activate electrically powered devices for movement of the guides. Examples of suitable drive mechanisms 100 are threaded drive devices, rack and pinion devices, gear drives, or hydraulic or pneumatic cylinders.

Shown in FIG. 2 is the vehicle seat 10 shown in FIG. 1, the seat belt adjustment mechanism 22 has been positioned such that the shoulder belts 24 have been moved within the slot 34 in the upper portion 20 towards each other, in a generally horizontal direction, to reduce the distance therebetween. Additionally, the seat belt adjustment mechanism 22 is shown after being vertically adjusted, as will be described below, so that the upper portion 20 containing the adjuster 22, the headrest 16 and the shoulder belts 24 are positioned higher than the position shown in FIG. 1. Vertical movement of the seat back upper portion 20, containing the seat belt adjustment mechanism 22, causes more separation between the upper portion 20 and the lower portion 18. The vertical adjustment bars 42, shown in greater detail in FIG. 4, therefore are exposed in the area between the head 20 and lower portions 18. Therefore, it is preferred that the exposed area have a flexible cover 36 for aesthetic reasons and to prevent dust and other contaminants from entering the area. The cover 36 is preferably connected to the underside of the upper portion 20 and the topside of the lower portion 18. It is further preferred that the cover 36 be a collapsible accordion-type cover so as to be compressed when the upper portion 20 is lowered towards the lower portion 18. Conversely, when the upper portion 20 is raised, the cover 36 expands thereby covering the area between the seat back body 18 and the upper portion 20. However, any manner of vehicle trim can be used to enclose or partially enclose the spaced area between the seat body 18 and upper portion 20.

Shown in FIG. 3 is a frame, indicated generally at 44, which can be used for the vehicle seat as shown in FIGS. 1 and 2. The lower portion 18 of the seat back 14 is supported by a seat back frame, indicated generally at 47. The seat back frame 47 preferably comprises a pair of generally vertical, laterally spaced apart, and generally hollow tubular members 46. Each member 46 is preferably connected at one end to a lower frame member, described below, and at the other end to at least one cross member 51. The cross member is optionally a horizontal cross member 52 of the present invention or one or more cross members 51 that are fixed between the generally vertical seat back frame members 46. The seat back frame 47 can also be laterally supported by any means such as crossing members or multiple horizontal cross members 51 or any other means for supporting the frame 47.

The seat bottom 12 is supported by the seat bottom frame 48. The seat bottom frame 48 can be any conventional frame assembly, and may comprise generally horizontal structural members 49 that are generally perpendicular to the vertical frame members 46. The horizontal structural members are connected to a recliner apparatus, indicated generally at 50. However, the seat belt adjustment mechanism 22 of the present invention can be used with any vehicle seat, including seats having any type of recliner mechanism or without a recliner apparatus.

Near the top of the seat back frame 46 is the upper portion of the seat back 14 with the cover 36 removed thereby showing the seat belt adjustment mechanism 22 of the present invention. The seat belt adjustment mechanism 22 includes a seat belt guide 23 (and in a four-point seat belt system a pair of seat belt guides 23) and a carrier assembly 21, to be described in greater detail below. Although there is a carrier assembly 21 mounted at each upper corner of the seat back frame 47, only one will be described with respect to FIGS. 4 and 5 since the carrier assemblies 21 are similar in function and structure. A headrest 16 can be mounted on a headrest support member 17 which is mounted on the horizontal cross member 52.

As best shown in FIG. 4, the horizontal cross member 52 has an elongated body having a generally H-shaped cross section defining a longitudinally extending upper recess 52a and lower recess 52b. The length of the cross member 52 is approximately the same as the width of the seat back 14, and has a length that corresponds to the distance between the vertical seat back frame members 46. Extending from the lower recess 52b are a pair of opposed vertical adjustment bars 42. The vertical adjustment bars 42 are preferably positioned and sized relative to the vertical seat back frame members 46 such that the bars 42 can be inserted within the hollow portion of the generally tubular frame members 46. The bars 42 preferably have a length such that the bars 42 can be raised relative to the top of the frame members 46 and still be structurally supported therewith.

Positioned within the upper recess 52a and generally aligned therewith is a lateral drive mechanism or assembly 60 having a threaded rod or screw 54 and a motor 58 rotationally connected thereto. Actuation of the motor 58 causes rotation of the screw 54. Screw 54 is preferably threadably engaged with a support block 53 such that rotation of the screw 54 causes horizontal movement of the support block 53. The support block 53 can be fixedly engaged with a generally hollow carrier block 56 wherein movement of the support block 53 causes movement of the carrier block 56 therewith. The carrier block 56 is supported on and fixedly connected to the support block 53. The support block 53 preferably has a complimentary shape with respect to the recess 52 so that the support block 53 is prevented from rotation. As such, the carrier block body is positioned above the upper recess 52a; however the carrier block 56 can be configured as to have any orientation. Extending from the carrier block body are first and second opposed legs 57 each having inner and outer faces. The legs 57 can be shaped to extend around the sides of the H-shaped horizontal cross member 52, as best shown in FIG. 4, such that the inner faces of the opposed legs slidingly engage the sides of the cross member 52. The carrier block 56 preferably has a slot 59 formed therein such that the flexible shoulder belt 24 can pass therethrough. At the end of each leg is a curved foot 57a such that the curved foot 57a slidingly engages the lower portion of the sides of the H-shaped cross member. The feet 57a secure the carrier block 56 from moving upwardly relative to the cross bar 52 while permitting translational movement there along.

Each carrier block 56 houses a respective seat belt guide 23. The seat belt guide 23 can be any suitable conventional belt retractor for dispensing a length of restraint. The guide 23 is preferably a length of flexible belt wrapped around a spool, a belt payout apparatus to allow dispensing a portion of the length of flexible belt, and optionally a retractor designed to collect the length of dispensed belt. The retractor may also include a restriction device for preventing paying out or dispensing the restraint during a high deceleration or acceleration event.

While the seat belt adjustment mechanism may be used with respect to a single seat belt guide and carrier assembly (as would be the case in a three-point seat belt system) it is understood that in a preferred embodiment the above described system is mirrored on the opposite end of the length of the horizontal cross member 52 (such as in a four-point seat belt system). In the embodiment having two opposed seat belt guides 23 and carrier assemblies 21, a separate motor 58 is connected to a separate screw drive 60 for each seat belt guide 23 and carrier 21 to move them horizontally. However, an alternate carrier assembly may include a generally centrally positioned single motor 58 connected to two screws 54, extending in opposite directions from the motor 58, such that operation of the motor causes both screws 54 to rotate. Rotation of each screw 54 causes the threadably engaged support block 53 to move along the length of the screw 54, which in turn causes the seat belt guide 23 to move accordingly. Rotation of the screw 54 in an opposite direction will cause the carrier assembly 21 to move in the opposite direction. The motor 58 is preferably connected to a control switch (not shown) such that the switch operates the motor 58 for rotation of the screw 54 in either direction. In an alternate embodiment, a knob (not shown) can be attached to the screw 54 such that manual operation of the knob causes the screw 54 to rotate thereby causing the carrier assembly 21 to move horizontally.

In the preferred embodiment, with a four-point seat belt system, the pair of guides 23 move synchronously with respect to each other. The synchronous motion is preferable to maintain generally uniform spacing between the edges of the horizontal cross member 52 and the guides 23. This is to prevent one guide 23 from moving a greater distance than the other when the seat belt guides 23 are adjusted. However, the seat belt guides 23 can move asynchronously so that each seat belt guide 23 can be independently positioned for the comfort of the occupant if so desired.

With vertical adjustment of the seat belt guides 23, the horizontal cross member 52 can move vertically with respect to the seat back frame 47. As the seat belt guides 23 are operatively attached thereto, movement of the cross member 52 will cause vertical displacement of the guides 23. As described above, vertical adjustment bars 42 are positioned within the upper seat back frame members 46. Connected to each vertical adjustment bar 42 is a vertical screw drive 61 comprising a screw 64 and motor 62. Each screw drive 61 is preferably positioned within each tubular seat back frame member 46. Each screw 64 can be threadably engaged with a vertical adjustment bar 42 such that rotation of each screw 64 causes each bar 42 to adjust therewith. The vertical screw drive 61 has been described as being within each seat back frame member 46; however the screw drive 61 can be located on one side of the seat 10 or on both sides. In a preferred embodiment, rotation of the vertical rod 64 causes the horizontal cross member 52 to move vertically therewith. Therefore, the seat belt guide 23, which is connected to the cross member 52, raises and lowers together with the cross member 52 while maintaining the guide 23's ability to move along a horizontal axis, preferably along the cross member 52. In the preferred embodiment, the headrest 16 (shown with a headrest support member 17 in FIG. 3) is also connected to the cross member 52 such that motion of the cross member 52 along a vertical axis will also cause the headrest 16 to move along the vertical axis. Motion on the vertical axis can also be by manually operated controls. As is preferred with horizontal movement of the seat belt guides 23, vertical adjustment of the seat belt guides 23 is also preferably synchronous. Such synchronous motion is to prevent one side of the cross member 52 from rising higher than the other side of the cross member 52. Additionally, the vertical motion has been described in conjunction with motorized means. However, it should be understood that manual operating means, such as a knob, a lifting mechanism, or other manual operation, such as directly raising the mechanism can be used to control vertical adjustment of the mechanism.

Shown in greater detail in FIG. 5 is the portion of the seat back frame 44 and seat belt adjustment mechanism 22 of FIG. 4 in a vertically and horizontally displaced position. In FIG. 5, the vertical adjustment bar 42 is more clearly shown as the bar 42 extends from the generally vertical seat back frame member 46 of the seat back frame 44. Also shown is the horizontal cross member 52 in a vertically displaced position as it has moved with the vertical adjustment bar 42. The carrier assembly 21 is also shown in a displaced position. Specifically, the carrier block 56 has been moved towards the center of the seat back frame 44, thereby reducing the distance between the seat belt guide 23 and the headrest (not shown).

Figure 6:
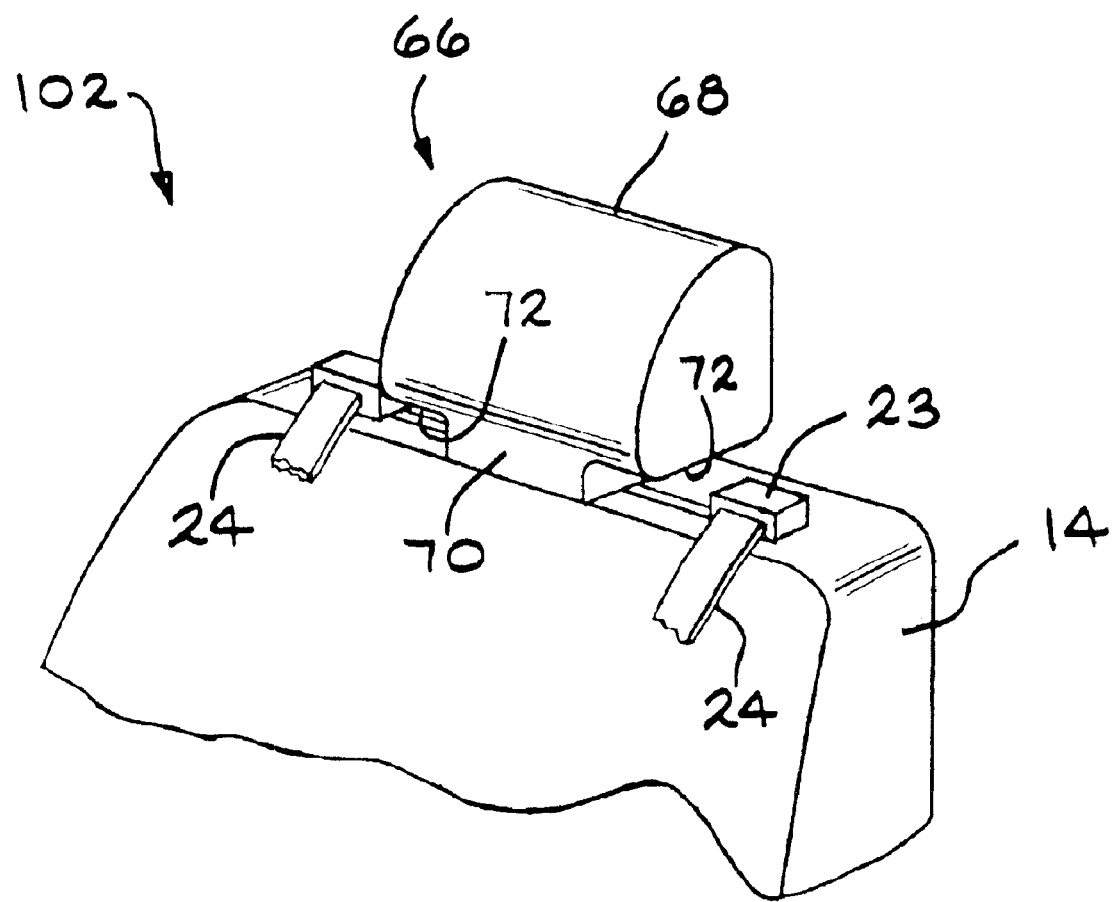
FIG. 6 is a perspective view of a portion of a vehicle seat depicting an alternate embodiment of the seat belt adjustment mechanism in accordance with the present invention.

Shown in FIG. 6 is an alternate embodiment of a portion of a vehicle seat 102, having a headrest 66 and a seat belt adjustment mechanism 23 in accordance with the present invention. However, unlike the embodiment described above, the headrest 66 and seat belt guides 23 are on the same level atop the seat back 14. Additionally, the headrest 66 is shown having a generally T-shape such that the headrest 66 defines an upper portion 68 and a neck 70 portion with the neck portion 70 extending from the top of the vehicle seat 102. The head 68 and neck 70 further define a pair of recesses 72 below the lower edges of the headrest 66 such that the seat belt guides 23, described above, can be moved horizontally as well as vertically without interference of the headrest. In a first embodiment, and as described above, the headrest 66 and seat belt guides 23 are connected to a horizontal cross member 52 such that vertical movement of the cross member 52 will also vertically adjust the positions the seat belt guides 23 and the headrest 66. Horizontal movement of the seat belt guides 23 can be as described above, however as the guides 23 move towards the headrest 66, they are received within the recess 72 defined by the T-shaped headrest 66. Alternatively, the T-shape of the headrest 66 can be designed to accommodate both the vertical and horizontal adjustment of the seat belt guides 23 such that the headrest 66 does not move at all. In another alternate embodiment, the T-shaped headrest 66 is separately adjustable from the seat belt guides 23. Therefore, the seat belt guides 23 can be vertically and horizontally adjusted independently from the adjustment of the headrest 66.

Although the embodiments of the seat belt adjustment mechanism shown and described above were movable along a generally vertical axis V and a generally horizontal axis H, as shown in FIG. 1, it should be understood that the adjustment mechanism could be movable along any suitable axis to move the guide 23 relative to an occupant's shoulder in relation to vertical and horizontal axes, or in other words, in a two-dimensional manner. It is generally desirable to move the guides 23 from a lower inwardly position to a higher outwardly position, which corresponds to the shoulder positions of a relatively short individual to a relatively tall individual. Thus, it is contemplated that the restraint apparatus or adjustment mechanism could be configured to move each guide 23 along a single respective axis A which is at an angled orientation relative to the vertical and horizontal axes, as shown in FIG. 1. Movement along this axis A would operatively move the guide 23 relative to both of the vertical and horizontal axes V and H.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A restraint apparatus for a vehicle seat comprising:
    a seat back defining a generally vertical axis and a generally horizontal axis, the seat back having a pair of opposing side members and a horizontal cross member extending between the opposing side members of the seat back;
    a guide for directing a restraint, said restraint adapted to pass over a shoulder of an occupant of the seat; and
    a pair of vertical members supported about the opposing side members of the seat back and further connected to the horizontal cross member;
    wherein movement of the vertical members along the vertical axis causes the cross member to move in a direction parallel to the vertical axis; and
    wherein the guide is movably mounted relative to the horizontal cross member along the horizontal axis.

2. The restraint apparatus defined in claim 1 including a drive mechanism operatively connected to the guide for accomplishing movement of the guide.

3. The restraint apparatus defined in claim 2 wherein the drive mechanism is manually operated.

4. The restraint apparatus defined in claim 2 wherein the drive mechanism is electrically powered.

5. The restraint apparatus defined in claim 2 wherein the drive mechanism includes a threaded member.

6. The restraint apparatus defined in claim 2 wherein the drive mechanism includes a threaded rod rotatably connected with a motor.

7. The restraint apparatus defined in claim 6 wherein the threaded rod is threadably engaged with a support block such that rotation of the threaded rod causes movement of the support block, said support block being connected with the guide.

8. The restraint apparatus defined in claim 1 further comprising a restraint retractor mounted on the guide wherein the retractor dispenses a length of restraint.

9. The restraint apparatus defined in claim 1 comprising a second guide for directing a second restraint, said second restraint adapted to pass over a second shoulder of the occupant wherein the second guide is movably mounted relative to the seat back along both the vertical and horizontal axes.

10. The restraint apparatus defined in claim 9 wherein the seat guides are movably mounted on the seat back.

11. The restraint apparatus defined in claim 10 wherein the guides are slidably mounted to a said horizontal cross member extending between said side members of said seat back wherein the cross member is supported on the seat back.

12. The restraint apparatus defined in claim 11 wherein the guides are adapted to move relative to one another along an axis defined by the cross member.

13. The restraint apparatus defined in claim 12 wherein the horizontal movement of the guides is generally synchronous in opposite directions.

14. The restraint apparatus defined in claim 1 wherein the pair of opposing side members of the seat back are generally tubular and are each adapted to receive one of the pair of vertical members within the generally tubular portion of the side members.

15. A restraint apparatus for a vehicle seat comprising a generally vertical seat back, a generally horizontal seat bottom, a headrest and a guide, the guide directing a restraint over a shoulder of an occupant of the seat;

wherein the guide is adapted to move vertically and horizontally relative to said seat back;

wherein the headrest is shaped so as to accommodate the horizontal movement of the guide; and wherein the headrest includes a recess formed in a lower corner portion of the headrest.

16. The restraint apparatus defined in claim 15 wherein the headrest is generally T-shape.

17. A restraint apparatus for a vehicle seat comprising:

a seat back for supporting an occupant, the seat back defining a generally vertical axis and a generally horizontal axis;

a cross member connected to a pair of oppositely spaced vertical members connected to opposing portions of the cross member, the generally vertical members being connected to the seat back;

a first guide for directing a first restraint, the first restraint being adapted to pass over a first shoulder of an occupant of the seat; and a second guide for directing a second restraint, the second restraint being adapted to pass over a second shoulder of the occupant of the seat;

wherein the first guide and second guide are movably mounted relative to the seat back such that the first guide and second guide are movable to alter the distance of the restraint from the respective first and second shoulders of the occupant relative to both of the vertical and horizontal axes; and wherein vertical movement of the vertical members causes generally vertical movement of the cross member, the vertical movement of the vertical members being generally synchronous in the same direction.

\* \* \* \* \*